C. H. KLOTZ.
HOSE COUPLING FOR CARS.
APPLICATION FILED FEB. 28, 1916.
1,213,110.
Patented Jan. 16, 1917.
2 SHEETS—SHEET 1.
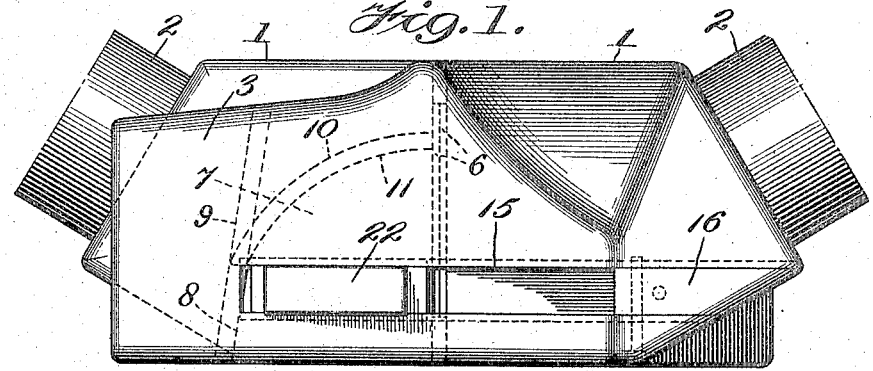
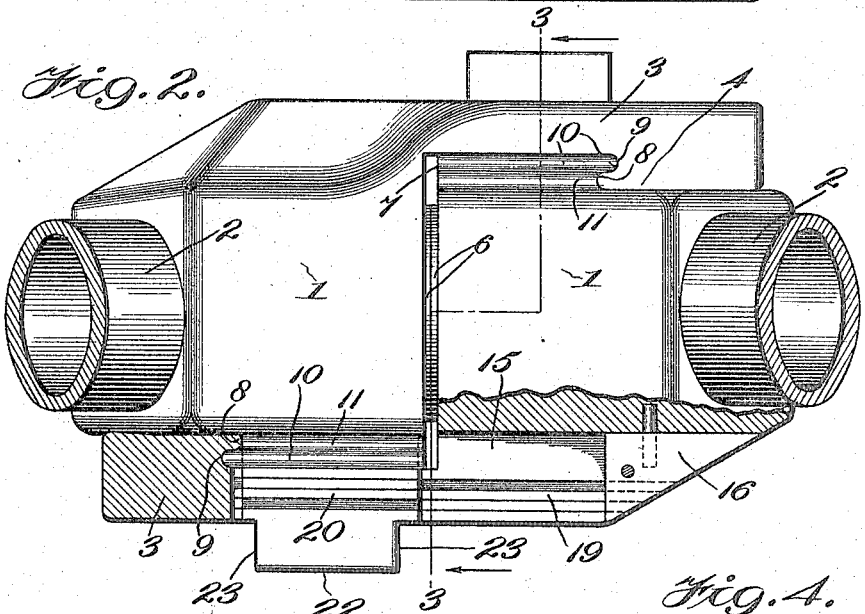
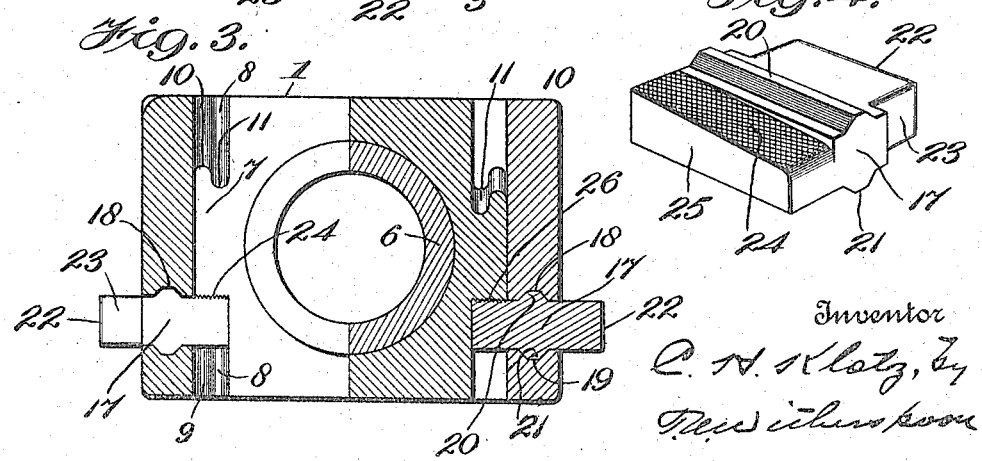

C. H. KLOTZ.
HOSE COUPLING FOR CARS.
APPLICATION FILED FEB. 28, 1916.

1,213,110.

Patented Jan. 16, 1917.
2 SHEETS—SHEET 2.

Inventor
C. H. Klotz,
T. W. Witherspoon
Attorney

UNITED STATES PATENT OFFICE.

CHARLES H. KLOTZ, OF WASHINGTON, DISTRICT OF COLUMBIA, ASSIGNOR, BY DIRECT AND MESNE ASSIGNMENTS, TO GOLD CAR HEATING & LIGHTING COMPANY, OF NEW YORK, N. Y., A CORPORATION OF NEW YORK.

HOSE-COUPLING FOR CARS.

1,213,110. Specification of Letters Patent. Patented Jan. 16, 1917.

Application filed February 28, 1916. Serial No. 80,953.

*To all whom it may concern:*

Be it known that I, CHARLES HENRY KLOTZ, a citizen of the United States, residing at Washington, in the District of Columbia, have invented certain new and useful Improvements in Hose-Couplings for Cars; and I do hereby declare the following to be a full, clear, and exact description of the invention, such as will enable others skilled in the art to which it appertains to make and use the same.

This invention relates to couplings for the fluid conducting pipes employed on railway trains, especially the steam carrying, or air conducting hose, and has for its object to provide a comparatively inexpensive, universal coupling which will be more efficient and certain in action than those heretofore proposed.

With these and other objects in view the invention consists in the novel details of construction and combination of parts more fully hereinafter described and particularly pointed out in the claims.

Figure 5:
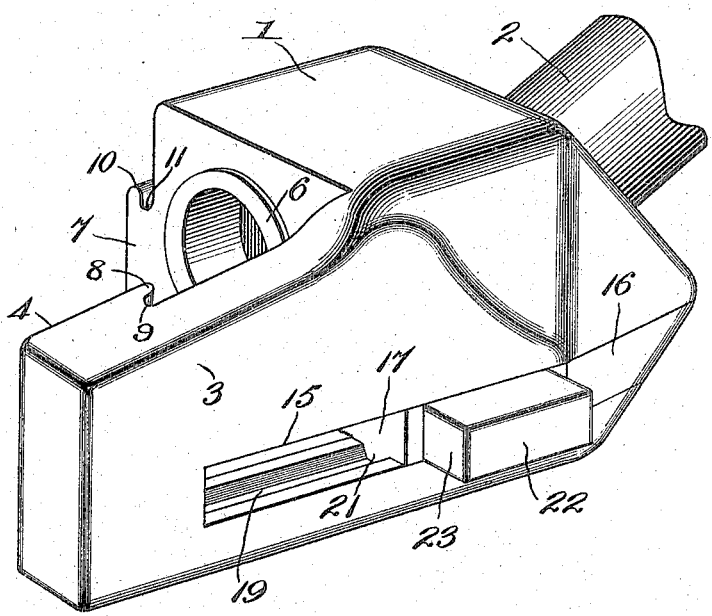
Figure 6:
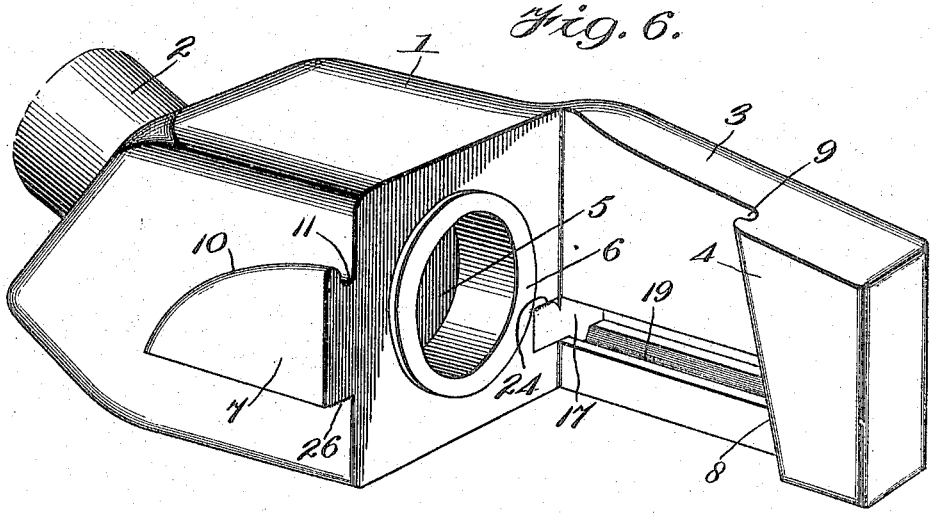

Referring to the accompanying drawings forming a part of this specification, in which like numerals designate like parts in all the views:—Figure 1 is a side elevational view showing the two members of the coupling in their locked position; Fig. 2 is a plan view partly in section of the parts shown in Fig. 1; Fig. 3 is a cross sectional view taken on the line 3—3 of Fig. 2, looking in the direction of the arrows; Fig. 4 is a detail perspective view of the locking wedge; Fig. 5 is a perspective view of one of the coupling members as seen from the outside thereof, and Fig. 6 is a perspective view of the parts shown in Fig. 5 as seen from the other side thereof.

The coupling comprises two complementary or matching halves each provided with a head or body 1, having a neck 2 to which the pipe or hose may be attached, and the arm or side member 3 carrying the coupling member or locking cam 4. Passing through the neck 2 and head 1, is the passage 5 for steam, air or other fluid; and 6 represents any suitable gasket, bushing or packing adapted to make a tight joint between the registering passages 5 when the two heads 1 are in their locked positions forming a coupling.

On each head 1 and on that side of each head opposite to the arm 3 is a locking lug 7 with which one of the cams 4 is adapted to engage. That is to say, the locking cam 4 on one head 1 is preferably provided with a straight inclined surface 8 and an undercut groove 9, as shown, while the locking lug 7 on the other head or coupling member 1, is provided with a curved locking surface 10 associated with a curved undercut groove 11. And the curved surface 10 of one member fits the groove 9 of the other member, while the straight surface 8 of the one member fits the curved groove 11 of the other member thus locking the two heads 1 together.

Each of the arms 3 is provided with a straight open ended slot 15 preferably closed at its open end as by means of the plug 16, and slidably mounted in said slot is the wedge member 17 as shown. The said slot 15 is preferably provided with grooves 18 and 19, (see Fig. 3), and the said wedge member 17 is provided with complementary ridges 20 and 21, fitting said grooves 18 and 19 respectively. The outer edge 22 of the wedge member 17 extends beyond the outer side of the arm 3 as plainly shown in the drawings, and is provided with the abrupt faces 23 which may be readily struck with a hammer or other tool in order to drive the wedge backward and forward in the slot 15. The inner portion 25 of the wedge 17 is slightly tapered as best illustrated in Fig. 4, and is also preferably roughened as at 24, which roughened surface may coöperate with a similar roughened surface 26 on the under side of the locking lug 7, (see Figs. 3 and 6).

It will now be clear from the mechanism so far disclosed, that the inclined cam surface 8 of the one coupling member is readily engaged with the groove 11 associated with the lug 7 of the other coupling member, whereupon the two coupling heads 1 are readily swung relatively to each other and their parts brought into the locking positions illustrated in Figs. 1 and 2, whereupon the locking wedges 17 are readily struck as on the surfaces 23, and the said wedges brought into position to firmly engage the under surfaces 26 of the locking lugs 7 whereupon the two coupling members are firmly locked in place. When it is desired to unlock the said coupling members, the said wedges 17 are readily struck with a suitable tool and moved out from underneath their respective locking lugs 7 whereupon the parts may again be reversely swung and disengaged in a manner well known to those skilled in the art.

It is an important feature of this invention that the locking edge 8 on each member 4 is straight and that the locking edge 10 is curved, for by this construction not only will the two heads 1 readily engage and disengage each other in the manner disclosed above, but the one head 1 will as readily engage and disengage a complementary locking head of the standard coupler now in general use on railway trains. The construction of this standard coupler may be understood from an inspection of Figs. 3 and 4 of the U. S. Patent No. 1,019,979, dated March 12, 1912, to Manchester. This said standard coupler is provided with a locking lug lettered E in Figs. 3 and 4 of the patent, and as will be clear from said figures, this said locking lug is engaged by a curved locking surface not lettered in said figures, but which is carried by the member D in said figures and is plainly shown in dotted lines. It will therefore be clear that by making the locking edge 8 straight and the other locking edge 10 curved as plainly shown in the drawings of this application, not only will the locking edge 8 of the one head 1 engage with the complementary locking edge 10 of the other head 1 but the locking heads 1 may be readily coupled with the locking heads A of the standard coupler such as is illustrated in the above mentioned patent. In addition to the above, it will now be clear that in the standard coupler, as illustrated in the above named patent, the parts are locked together by means of the locking end l of the locking pin L which engages the upper surface of the member D as best illustrated in Fig. 3 of the said patent. It will also be clear that in both the standard coupler and the coupler of this application, the two ends of the hose pipe support the two coupler members and that the latter will be pulled down by gravity so that they will tend to tighten the joint lettered F in the said patent. Therefore, the tendency of the member D in said patent is to separate from the locking end l of the said locking pin L and as a consequence the said pin can work loose in practice unless complicated and more or less expensive means are employed to lock it in position. In the present invention on the other hand, the weight of the two parts tending to separate, is brought to bear directly on the locking wedges 17 so that the above mentioned tendency to work loose is entirely absent. As a matter of fact, a little consideration will show that as the two ends of the hose pull up, so to speak, on the two coupler members, the tendency is to revolve each member around the wedge 17, as a sort of center, so that the surfaces 26 of the locking lug 7 are caused by the weight of the members to bite into the wedge, and to hold it in place. In addition to this, owing to the wedging action and the facility with which the wedge may be driven home, the joint between two packing members 6 can be made as tight as may be desired, while the said wedges 17 may be as readily driven out of place and the couplings unlocked, whereupon they may be readily separated.

The grooves 18 and 19 in the slot 15 and the co-acting members 20 and 21 on the wedges 17 are important features of the invention in that the strains above disclosed are such that without these said grooves the wedges 17 would be liable to cock out of place and therefore the efficiency of the coupling would not be as great as it is when provided with these said grooves. Further since the standard coupler at present is locked by means of the pin L shown in the patent above mentioned, it follows that when one of the coupling heads of the present invention is joined to one of the coupling heads of the standard coupler, a single wedge 17 is sufficient to hold the two parts together. But it is necessary to provide each arm 3 with a wedge 17, in order to insure that there will always be present a wedge when joining with standard couplers. When two heads of the present invention are joined each of the wedges 17 can be jammed home or not, as the operator desires.

It is obvious that those skilled in the art may vary the details of the invention without departing from the spirit thereof, and therefore I do not wish to be limited to the above disclosure except as may be required by the claims.

What I claim is:—

1. In a pipe coupling the combination of a pair of complementary coupling members each having on one face thereof a locking lug provided with a curved groove and locking edge, and on the other face thereof an arm provided with a straight groove and locking edge member, the said curved groove and curved locking edge of the one coupling member adapted to be engaged by the said straight edge and straight groove respectively of the other coupling member; and means to positively lock the said coupling members firmly in position, comprising a member mounted in a channel extending longitudinally of said arm and having an inclined locking face, said member adapted to be moved into locking engagement with the lug of the mating coupler when the couplers are brought together, and to positively lock them in such position, and said inclined locking face adapted to hold the parts tightly together and to compensate for wear.

2. A coupling head provided on one face thereof with a locking lug having a lower face against which a sliding locking member may take, said head also having extending from another face thereof an arm provided with a slot extending substantially lengthwise of the coupling and a sliding locking member in said slot having an inclined locking surface, substantially as described.

3. A coupling head provided on one face thereof with a locking lug having a curved groove and locking edge as well as a flat lower surface against which a sliding locking wedge may take, said head also having extending from another face thereof an arm provided with a slot extending longitudinally of the coupling, a sliding wedge in said slot, and a straight locking groove and edge located near the end of said arm, substantially as described.

4. In a pipe coupling, the combination of a pair of matching coupling heads each provided on one face thereof with a locking lug having a curved groove and locking edge, as well as a flat surface adapted to be engaged by a locking wedge, and each of said heads having extending from another face thereof an arm having a slot, a sliding wedge in said slot, and near the end of said arm an inclined straight groove and locking edge, the last named locking edge of the one head adapted to engage the firt named curved groove of the other head, and the said wedge of the one head adapted to engage the flat surface of the locking lug of the other head, substantially as described.

5. A pipe coupling head having extending from one face thereof an arm having a slot provided with grooves, and a wedge provided with ridges adapted to move in said grooves, substantially as described.

6. A pipe coupling head having extending from one face thereof an arm having a slot provided with grooves; a roughened wedge provided with ridges adapted to move in said grooves; and said head also provided on another face thereof with a locking lug having a flat surface against which a roughened sliding wedge may take, substantially as described.

7. In a gravity coupler of the direct port type having mating couplers, each provided with a body having a lug and an arm having a cam, said cam adapted to engage behind a lug on the body of the mating coupler when the couplers are coupled, means for positively locking the couplers in such position comprising a locking member mounted in a channel extending longitudinally of said arm and adapted to be moved thereon to engage beneath a portion of the lug on the mating coupler when the couplers are coupled.

8. In a gravity coupler of the direct port type having mating couplers, each provided with a body having a lug and an arm having a cam, said cam adapted to engage behind a lug on the body of the mating coupler when the couplers are coupled, means for positively locking the couplers in such position comprising a locking member mounted in said arm and having a beveled locking surface and adapted to be moved longitudinally of said arm to engage beneath a portion of the lug on the mating coupler when the couplers are coupled.

9. In a gravity coupler of the direct port type having mating couplers, each provided with a body having a lug and an arm having a cam, said cam adapted to engage behind a lug on the body of the mating coupler when the couplers are coupled, means for positively locking couplers in such position comprising a wedge mounted in a channel in said arm and adapted to be moved in said channel to engage beneath the lug on the mating coupler when the couplers are coupled.

In testimony whereof I affix my signature, in presence of two witnesses.

CHARLES H. KLOTZ.

Witnesses:
  LINTON T. WEST,
  HOWARD L. WEBSTER.